June 2, 1970   W. L. ENDSLEY, JR   3,515,406
SLIDING RETRACTABLE PORCH FOR CAMPER BODIES
Filed Oct. 7, 1968   2 Sheets-Sheet 1

William L. Endsley, Jr.
INVENTOR

June 2, 1970   W. L. ENDSLEY, JR   3,515,406
SLIDING RETRACTABLE PORCH FOR CAMPER BODIES
Filed Oct. 7, 1968   2 Sheets-Sheet 2
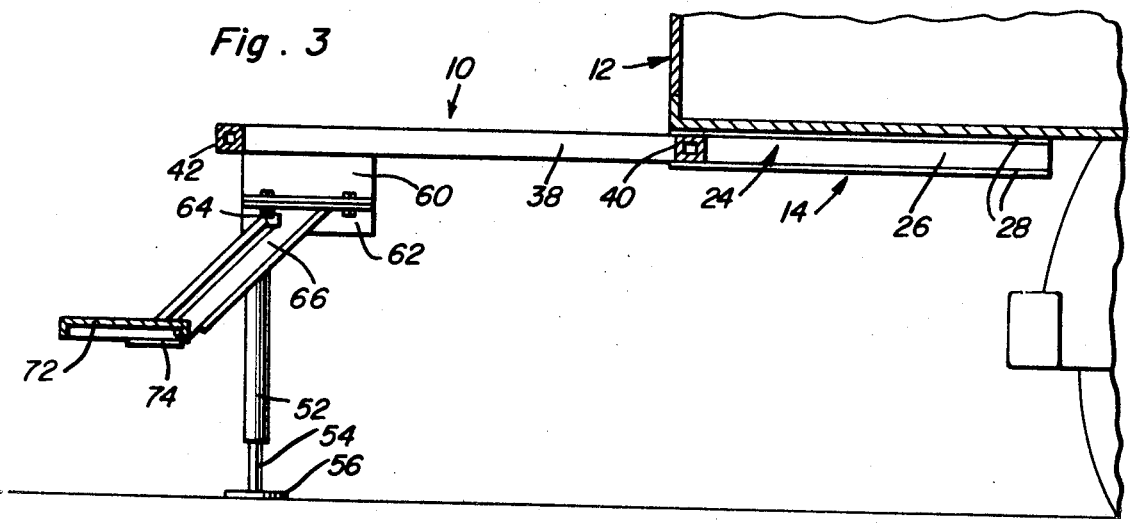
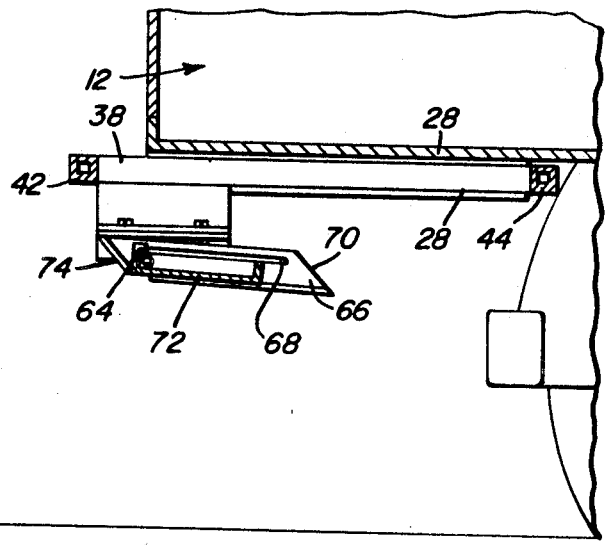
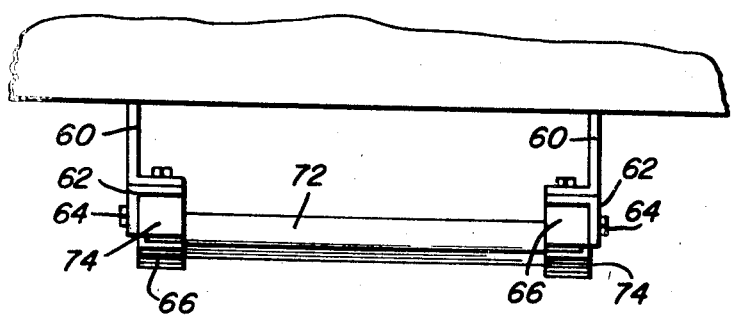
William L. Endsley, Jr.
INVENTOR.

United States Patent Office 3,515,406
Patented June 2, 1970

3,515,406
SLIDING RETRACTABLE PORCH FOR
CAMPER BODIES
William L. Endsley, Jr., 1309 Planz Road,
Bakersfield, Calif. 93304
Filed Oct. 7, 1968, Ser. No. 765,355
Int. Cl. B60r 3/02
U.S. Cl. 280—166                                    1 Claim

ABSTRACT OF THE DISCLOSURE

A porch device for use with camper bodies of the type normally mounted on pick-up trucks. The planar surface of the porch is mounted for sliding engagement under the rear portion of the camper body to slide thereunder in a position of non-use.

In camper bodies normally associated with pick-up trucks, entrance and egress thereinto is accomplished through a door at the rear of the camper body. This then leaves the entrance to the camper suspended well above the ground requiring an almost ladder-like appliance to get into and out of the camper. This becomes a further inconvenience if it is desired to sit outside the camper and go into or out thereof for any reason since it requires a climbing up and down of the ladder.

The present invention relates to a sliding porch attachment for use on camper bodies that incorporates a step to gain access to the porch. The porch attachment provides a large planar surface at the rear of the camper body which serves as a landing so that when it is desired to leave the immediate vicinity of the camper an occupant does not have to climb down to ground level to sit down. Further, with the porch attachment in a position of use there is not a sheer drop out the camper door thereby eliminating a potential hazard to children or to the housewife of the family. The porch provides a convenient area in which to sit or sunbathe, and can also be used as a dining table by placing chairs around the periphery thereof on the ground.

It is therefore an object of this invention to provide a simple but unique porch for camper bodies that are used on pick-up trucks.

It is a further object of this invention to provide a porch for camper bodies that completely retracts under the camper body to which it is attached.

It is a further object of this invention to provide a camper body with a porch that is level with and adjacent to the door thereinto with steps leading from the ground to the porch.

It is a still further object of this invention to provide a retractable porch with a retractable step attached thereto for use with camper bodies.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a side elevational view of the porch and step in a position of use.

FIG. 4 is a side elevational view of the porch and step in a retracted position.

FIG. 5 is an enlarged elevational view of the step structure in the retracted position.

Figure 1:
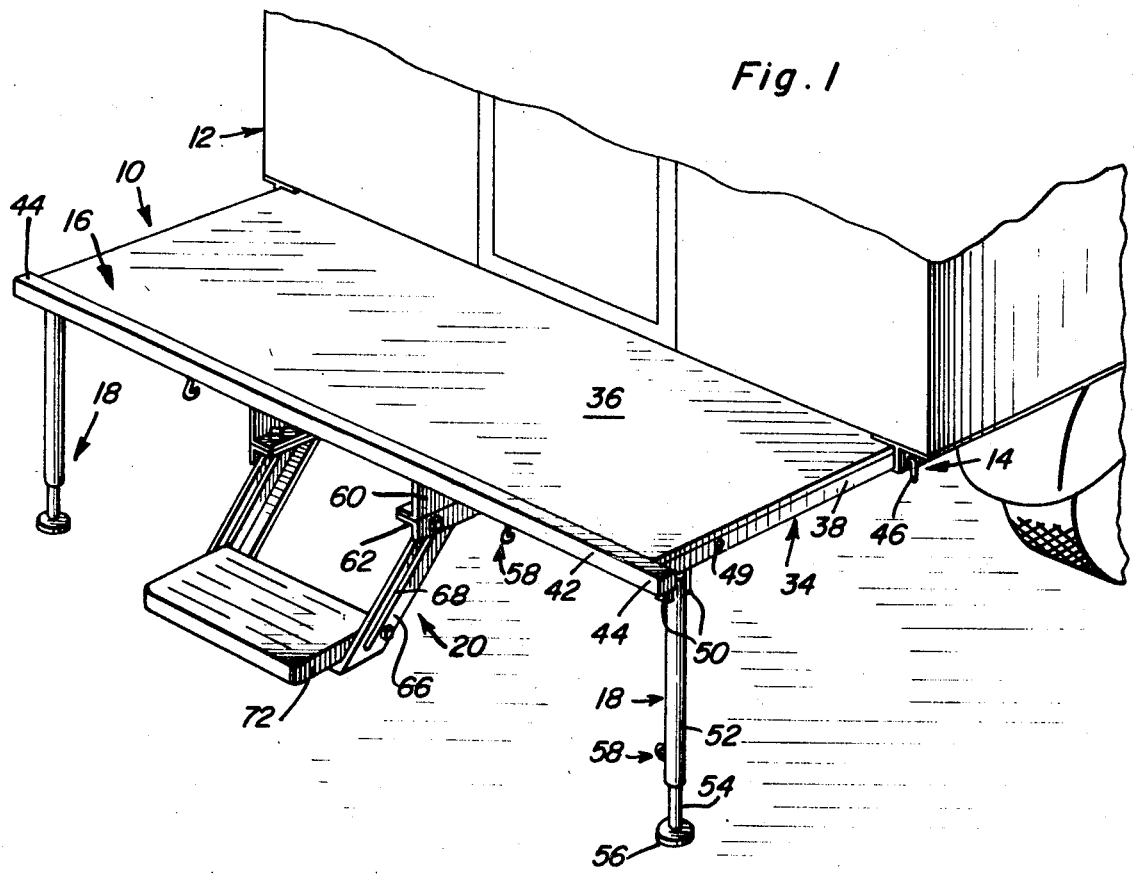
FIG. 1 is a perspective view of the porch and step thereon in a position of use.

Referring now to the drawings the numeral 10 generally indicates the porch structure and numeral 12 indicates a camper body. The porch structure 10 is generally composed of a mounting structure 14, a planar surface 16 slidable therein, a support structure 18 and a step assembly 20.

The camper body 12 does not form a part of the invention but is shown generally in the drawings to indicate the environment in which the device is used. The camper body usually hangs over the rear of the bed of the pickup truck and is supported thereon by a framework which is a structural part of the camper body. The mounting structure 14, for the sliding retractable porch 10 which comprises two track assemblies 22 is attached to the framework of the camper body. The track assemblies 22 are mounted in parallel spaced relation near each side of the camper body and comprise a generally U-shaped channel 24 having a web or base portion 26 with two perpendicularly extending legs 28. One of the legs 28 is attached to the bottom of the camper body 12 so that the web portion 26 is exterior of the mounting and the two legs 28 open inwardly of the camper body. A series of lugs 30 with holes therethrough are attached to the leg 28 to receive bolts 32 therethrough to facilitate the attachment of the channel 24 to the camper body. With the two track assemblies 22 thus aligned longitudinally of the camper body and mounted in parallel spaced relation, the inwardly facing openings formed by the legs 28 thereof define the track for the planar surface 16 of the porch.

Figure 2:
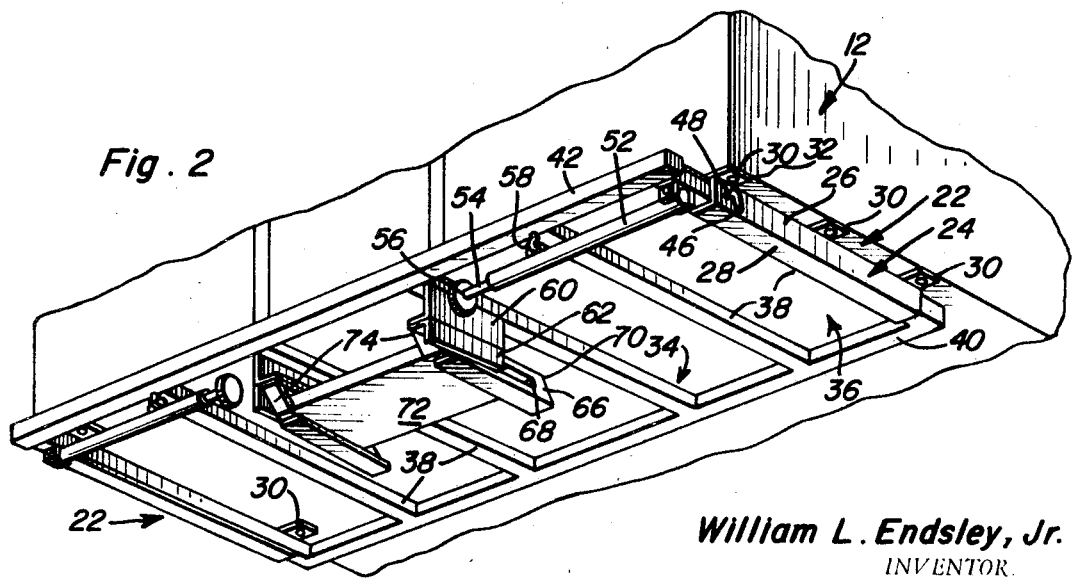
FIG. 2 is a perspective view of the porch and step in their retracted position.

The planar surface or floor 16 of the porch has a framework 34 and a cover surface 36 thereover. The framework 34 is comprised of a series of parallel spaced longitudinal members 38 which are fixed at the rear to a brace 40 and at the front thereof to a brace 42. The rear brace 40 is of a length to fit in the path defined by the track assemblies 22, while the front brace 42 is slightly longer with an overhang 44 at each end thereof. The framework 34 thus formed provides a rigid base upon which to attach the cover surface 36, which may be of any suitable material such as exterior grade plywood. With the framework and cover surface 36 thus assembled the floor 16 is complete and can slide along the path defined by the track assemblies 22. When the floor is in the fully retracted position shown in FIGS. 2 and 4, a portion of the floor extends outwardly beyond the camper body to provide a step on which to gain access to the camper body. To prevent inadvertent extension of the floor surface during travel a crank 46 with a threaded shank 48 is received in a threaded opening in the web portion 26 of the track assembly near the end thereof to cooperate with a hole 49 in the end longitudinal member 38 of the framework.

When the floor 16 is in the extended position, such as shown in FIGS. 1 and 3, a support structure is needed such as the supporting legs 18. The legs 18 are pivotally mounted to the longitudinal members 38, at the edge of the framework, by a pair of vertically depending lugs 50 with holes therethrough defining an axis of rotation longitudinally of the camper body. The legs 18 comprise an upper cylindrical member 52 and a lower cylindrical member 54 receivable therein. The upper cylindrical member 52 has a pin extending through the lugs 50 and through the one end thereof to pivotally mount the leg thereto. The lower cylindrical member 54 has a ground engaging pad or foot 56 attached thereto to distribute the load of the porch over a larger area of the ground so as not to sink therein. The upper cylindrical member 52 and the lower cylindrical member 54 may be made relatively adjustable by any convenient means such as a threaded connection therebetween or a locking pin extending through the two tubes. With the pivotal axis of the leg 18 extending longitudinally of the vehicle the legs fold upwardly and inwardly of the floor 16 and have a cooperating hook and eye structure 58 to hold the legs in the stored position. Since the legs 18 are pivoted adjacent the front brace 44 of the floor the legs when in the retracted position do not interfere with the track assemblies since they are beyond the end of the track assemblies. The adjustability provided between the upper and lower sections of the legs 18 allow the porch support to be varied according to the terrain on which the vehicle is parked.

The step structure 20 can be any one of a number of commercially available units and can be mounted from the two central longitudinal members 38 of the framework, which longitudinal members are centered about the doorway to the camper body. The mounting for the step consists of a pair of angular braces 60 which are attached to the members 38 so that one leg thereof extends perpendicular to the surface of the porch floor and the other leg of the brace 60 extends inwardly. The angular braces 60 have a second angular brace 62 attached to the horizontal flange of the angular brace 62 attached to the horizontal flange of the angular brace 60 so that the perpendicular flanges are coplanar and the horizontally extending flanges are juxtaposed forming a T-shaped member. The vertically extend flange of the second angular brace 62 has a stud 64 fixed to the inside thereof with the head of the stud extending horizontally inward. The stair structure comprises two angular side brace members 66 which have an elongated slot 68 in the side thereof through which is received the stud 64. The side brace members 66 therefore can slide along the studs 64 to a point where they extend beyond the end of the angular braces 66 and 62, at which point they drop downwardly where an angular end 70 on the side brace members engage the horizontally extending flanges of the braces 60 and 62. This holds the side brace members in the angularly downwardly extending position shown in FIG. 3. A step 72 is pivoted at the rear thereof to the free end of the side brace members 66 so that when the side brace members are in the position above referred to, the step can be pivoted into a position parallel wtih the porch floor. A pair of inwardly extending flanges 74 are fixed to the free ends of the side brace members 66 to hold the step 72 in the horizontal position. With the step structure thus aligned in the center of the porch to align with the door to the camper body when the porch is in the retracted position, the portion of the floor extending beyond the camper body forms a first step, and the step assembly 20 in its position of use provides a second step.

The operation of the porch structure is relatively simple and straight forward, as can be seen from the structure herein disclosed. When the vehicle is positioned at a camp site the crank 46 is turned to withdraw the shank thereof from the cooperating hole 49 in the frame assembly of the porch to release it from its locked non-use position. The porch floor assembly 16 is then withdrawn from under the camper body until fully extended, at which point the leg assemblies 18 are unhooked from their secured position and allowed to drop to the perpendicular position where they can be adjusted to engage the ground and hold the floor assembly in a horizontal position. The sliding step can then be withdrawn from the rack and allowed to hang down into the horizontal position to complete the setting of the porch assembly such as shown in FIG. 3. The porch thus set up can be used to place chairs on or for additional space for sleeping, or if desired, chairs can be set on the ground around the floor surface to be used as a table upon which to eat. If sufficient room to extend the porch is not available at the camp site, the porch surface can be left in the non-used position, such as shown in FIG. 4, wherein the part thereof extending out from under the vehicle will provide a step or ledge adjacent the door to the camper and sliding step may be extended outwardly to provide easy access thereto. When it is desired to leave the camp site the reverse procedure of the setting up is followed wherein the step is retracted into its mounting bracket, the legs are retracted and hung on their hooks 58, and the entire assembly slid under the camper body. With the locking of the porch into its non-use position by the crank 46 the securing operation is completed.

The porch structure as described herein provides a versatile extension of the floor area of the well-known camper bodies when it is in its extended position. When the structure is in its withdrawn position it is still extremely functional and usable in that it obviates the need for the ladder or stepping structure to gain access to the door the camper body, which is normally spaced quite high above the ground. The use of the porch is especially desirable after a rain or when there are wandering wild life that may endanger the occupants of the camp site. The porch, then, provides a dry surface easily accessible from the interior of the camper and completely independent of surrounding ground conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a camper body supported from a pick-up type vehicle body with the rear of the camper body having an access door centrally located therein and a bottom surface extending from side to side thereof, a pair of substantially parallel, laterally spaced, longitudinal track assemblies mounted on the bottom surface of the camper body and extending forwardly from a point adjacent the rear edge of the camper body, said track assembly defining facing channel-shaped guideways and being oriented adjacent the side edges of the bottom surface of the camper body, a porch of substantially rectangular configuration extending substantially across the entire width of the camper body and including parallel side edges slidably supported in said track assemblies for movement longitudinally in the track assemblies between a stored position substantially completely disposed below the bottom surface of the camper body and an operative position projecting rearwardly from the bottom surface of the camper body and forming substantially a continuation thereof to provide a porch area rearwardly of the camper body, a longitudinally adjustable supporting leg at the rearmost two corners of the porch to support the rear edge of the porch when in operative position, means connecting the legs to the porch for pivotal movement from a downwardly extending operative position to a stored position along the undersurface of the rear edge of the porch when the porch is moved forwardly to inoperative position, step means mounted on said porch to provide access thereto when in operative position, said step means being foldable to a compact and inoperative position wthen the porch is moved to stored position, and means releasably retaining the porch in stored position in substantially underlying relation to the bottom surface of the camper body thereby enabling the camper body and pck-up vehicle to be driven over the road without interference from the porch, supporting legs or step means, said step means including a pair of longitundinally extending mounting brackets at the center rear undersurface of the porch, said mounting brackets extending longitudinally a minor portion of the length of the porch, a longitudinally slotted mounting plate connected to each bracket, a step mounted between said slotted plates, and means interconnecting the slotted plates and the brackets to enable the slotted plates and step therebetween to move from an operative position with the step horizontally disposed below the plane of the porch and rearwardly thereof to a stored position in underlying closely spaced relation to the porch with a portion of the step and mounting plates disposed forwardly of the mounting brackets, said legs being pivotally mounted for lateral swinging movement in a plane substantially parallel to the rear edge of the porch, and releasable means retaining the legs in horizontal position below the undersurface of the porch, said legs being disposed outwardly of the brackets with the lower edge of the brackets being disposed below the legs when in their horizontal position.

References Cited

UNITED STATES PATENTS

| | | | | |
|---|---|---|---|---|
| 3,073,467 | 1/1963 | Parks | | 280—150.5 |
| 2,786,710 | 3/1957 | Chapman | | 296—23 |
| 3,008,533 | 11/1961 | Haberle | | 182—88 |
| 3,416,836 | 12/1968 | Swanby | | 280—166 |

LEO FRIAGLIA, Primary Examiner

R. R. SONG, Assistant Examiner

U.S. Cl. X.R.

296—23